United States Patent
Hällgren et al.

(10) Patent No.: US 11,981,874 B2
(45) Date of Patent: May 14, 2024

(54) DEWATERING OF THERMOCHEMICAL OIL

(71) Applicant: PREEM AKTIEBOLAG, Stockholm (SE)

(72) Inventors: Anne-Charlotte Hällgren, Sollentuna (SE); Nils Anders Nilsson, Järna (SE); Tomasz Janosik, Huddinge (SE)

(73) Assignee: PREEM AKTIEBOLAG, Stockholm (SE)

( * ) Notice: Subject to any disclaimer, the term of this patent is extended or adjusted under 35 U.S.C. 154(b) by 0 days.

(21) Appl. No.: 17/615,480

(22) PCT Filed: Jun. 4, 2020

(86) PCT No.: PCT/EP2020/065525
§ 371 (c)(1),
(2) Date: Nov. 30, 2021

(87) PCT Pub. No.: WO2020/245296
PCT Pub. Date: Dec. 10, 2020

(65) Prior Publication Data
US 2022/0145190 A1  May 12, 2022

(30) Foreign Application Priority Data
Jun. 7, 2019  (EP) ..................................... 19178936

(51) Int. Cl.
*C10G 7/04* (2006.01)
*C10G 7/08* (2006.01)

(52) U.S. Cl.
CPC ................. *C10G 7/04* (2013.01); *C10G 7/08* (2013.01); *C10G 2300/1011* (2013.01); *C10G 2300/4006* (2013.01); *C10G 2300/4012* (2013.01)

(58) Field of Classification Search
CPC .................................. C10G 7/04; C10G 7/08
See application file for complete search history.

(56) References Cited

U.S. PATENT DOCUMENTS

| 4,204,915 A * | 5/1980 | Kurata ..................... C07C 51/46 203/67 |
| 2011/0146140 A1* | 6/2011 | Brandvold ............... B01D 3/36 44/309 |
| 2013/0014431 A1 | 1/2013 | Jin et al. |
| 2013/0105356 A1 | 5/2013 | Dijs et al. |
| 2014/0256965 A1 | 9/2014 | Asikkala et al. |

OTHER PUBLICATIONS

Riemenschneider et al., "Esters, Organic" In: "Ullmann's Encyclopedia of Industrial Chemistry", Wiley-VCH, Weinheim, 2005, vol. 13, pp. 245-266.

* cited by examiner

*Primary Examiner* — Randy Boyer
(74) *Attorney, Agent, or Firm* — James S. Keddie; Bozicevic, Field & Francis LLP

(57) ABSTRACT

A process for dewatering a thermochemical oil. The process comprises providing a thermochemical oil comprising water; adding a solvent selected from mesityl oxide, 2-methyltetrahydrofuran, dioxane and furfural to the thermochemical, oil, to form a mixture comprising the thermochemical oil and the solvent; heating the mixture to remove an azeotrope comprising water and the solvent from the mixture, thereby forming a dewatered thermochemical oil. A dewatered thermochemical oil. A fuel precursor.

11 Claims, 1 Drawing Sheet

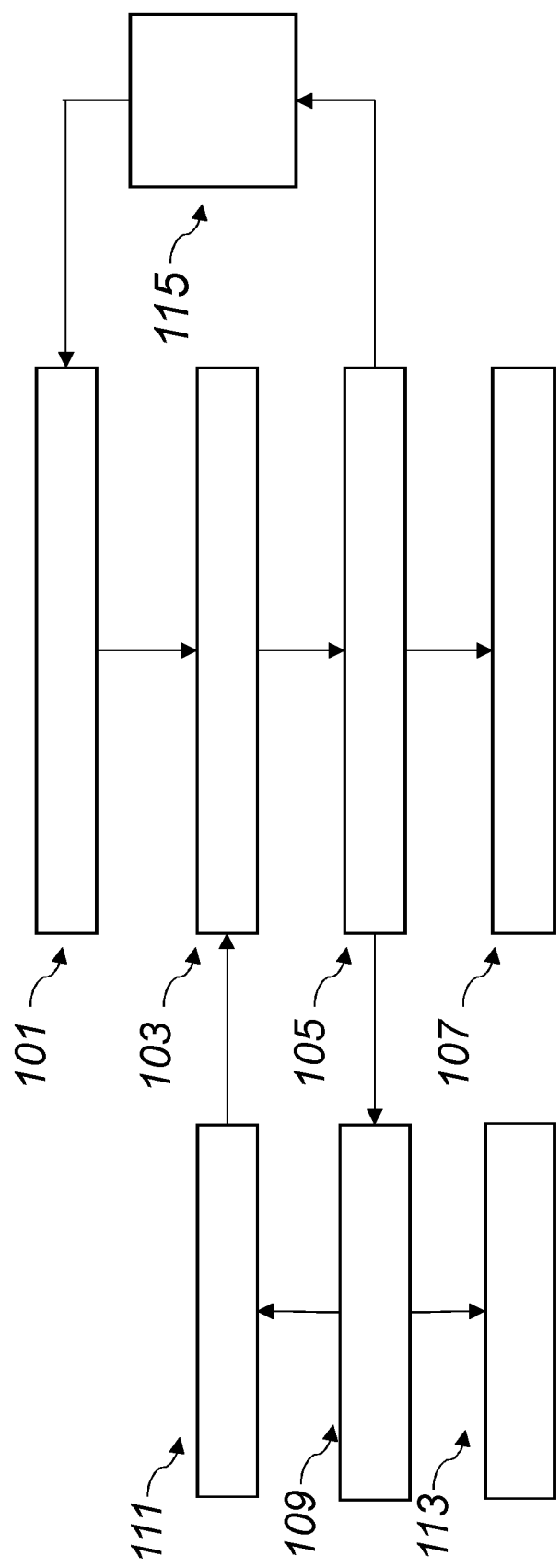

DEWATERING OF THERMOCHEMICAL OIL

CROSS-REFERENCE TO RELATED APPLICATIONS

This application is a § 371 national phase of International Application No. PCT/EP2020/065525, filed on Jun. 4, 2020, which claims the benefit of European Application No. 19178936.1, filed on Jun. 7, 2019, which applications are incorporated by reference herein.

TECHNICAL FIELD

The present invention relates to a process for dewatering a thermochemical oil, such as a pyrolysis bio oil; a dewatered thermochemical oil and a fuel precursor.

BACKGROUND

Pyrolysis bio oils obtained by pyrolysis of different types of biomass (e.g. lignocellulosic biomass) display properties making them poorly miscible or completely immiscible with fossil fuel feedstocks such as light gas oil (LGO) and vacuum gas oil (VGO), or for that matter with lipophilic renewable refinery feedstocks like fatty acids or fats due to their highly polar nature and high water content. Processing towards feed manufacture suitable for standard hydrotreatment and/or hydrocracking oil refinery reactors to manufacture transport fuels and chemicals having a lowered carbon footprint as a result of an increased use of pyrolysis oils as renewable feedstocks is therefore challenging.

One issue that has proved challenging is that pyrolysis oils have a relatively high water content (typically 10-30%). This causes problems under any conditions which involve for instance water-sensitive catalysts or chemical reaction conditions not compatible with high water content [1]. Water removal from pyrolysis oils is therefore common in the art, and may for instance be performed by fractional distillation at elevated temperatures, which however usually causes extensive chemical reactions between the components of the pyrolysis oils, eventually leading to oligomers or polymers, which make subsequent processing difficult and low-yielding.

Therefore, it is desirable to facilitate an improved process for dewatering pyrolysis oils, as well as other thermochemical oils, which is less likely to cause the formation of unwanted side products.

SUMMARY OF THE INVENTION

An object of the present invention is to provide a process for dewatering thermochemical oil which provides a thermochemical oil suitable as a feedstock in e.g. the fuel industry. This and other objects, which are apparent to a person skilled in the art having studied the description and the appended claims, are accomplished by a process for dewatering a pyrolysis oil comprising
 a) providing a thermochemical oil comprising water;
 b) adding a solvent selected from mesityl oxide, 2-methyltetrahydrofuran, 2-butanone, dioxane and furfural to the thermochemical oil, to form a mixture comprising the thermochemical oil and the solvent;
 c) heating the mixture to remove an azeotrope comprising water and the solvent from the mixture, thereby forming a dewatered thermochemical oil.

The inventors have found that by adding a solvent selected from mesityl oxide, 2-methyltetrahydrofuran, methyl iso-butylketone, 2-butanone, dioxane and furfural to the thermochemical oil, an azeotrope comprising water and said solvent can be formed which can be boiled off under mild conditions under which the organic components of the thermochemical oil remain relatively intact while at the same time removing undesired volatile organic low molecular weight molecules that do not contribute positively to the target end-product during downstream processing, or cause corrosion problems in process equipment. Advantageously, the inventive process yields a dewatered thermochemical oil which is suitable for further downstream processing and which reduces the risk of corrosion problems in process equipment, owing to the low amount of unwanted reaction species formed under the mild reaction conditions of inventive process.

The mild conditions further avoid extensive oligomerization and polymerization reactions in the pyrolysis oils thereby decreasing the risks of clogging transfer lines downstream by undesired separation of poorly soluble components, as well as by lowering the coking tendency of the thermochemical oil during subsequent hydrotreatment upgrading.

Herein, the term "thermochemical oil" refers to crude or refined oil resulting from thermochemical conversion, i.e. chemical conversion at elevated temperature, of organic material, such as biomass, e.g. sawdust, or organic waste, e.g. food waste or fossil waste, such as disposed tyres or plastics. The thermochemical conversion typically results in liquefaction of the organic material. Herein, the term "organic material" refers to carbon-based renewable or fossil material. The thermochemical oil may be a thermochemical bio oil, the term "bio" indicating that it results from thermochemical conversion of renewable organic material.

The thermochemical oil may be a pyrolysis oil, preferably a pyrolysis bio oil, a hydrothermal liquefaction oil, preferably a hydrothermal liquefaction bio oil, or a blend thereof, more preferably a pyrolysis oil, most preferably a pyrolysis bio oil. The pyrolysis oil may be a fraction extracted from pyrolysis oil. For example, a fraction rich in sugars and anhydrosugars, and a pyrolytic lignin fraction can be extracted from pyrolysis oil. Herein, the term "pyrolysis oil" refers to a crude or refined oil resulting from pyrolysis of organic material.

Pyrolysis is a thermochemical decomposition of organic material, such as sawdust or disposed tyres, at elevated temperature in the absence of oxygen. Pyrolysis may involve thermal pyrolysis, catalytic pyrolysis or hydrogen pyrolysis. Herein, the term "hydrothermal liquefaction oil" refers to a crude or refined oil resulting from hydrothermal liquefaction of organic material. Hydrothermal liquefaction is a thermochemical decomposition of wet organic material, typically biomass or food waste, in supercritical water at high pressure.

Thermochemical oils comprise, almost without exception, water. As an example pyrolysis bio oil generally has a water content in the range of 10-30% by weight of the thermochemical oil.

Herein, the term "dewatered" refers to that the thermochemical oil in question has a water content after the above-described process which is lower than the water content of the thermochemical oil as provided. The dewatered thermochemical oil of the present disclosure may have a water content of less than 10% by weight of the dewatered thermochemical oil, such as less than 5%, by weight of the dewatered thermochemical oil, preferably less than 0.5%, by weight of the dewatered thermochemical oil.

Herein, the term "mesityl oxide" may refer also substituted derivatives of mesityl oxide, such as mono-substituted mesityl oxide or di-substituted mesityl oxide. Technical grade mesityl oxide is readily available and known to a person skilled in the art. Other solvents suitable for the inventive process include 2-methyltetrahydrofuran, 2-butanone, dioxane and furfural, which are also available in technical grade and known to a person skilled in the art.

Herein, the term "azeotrope" refers to a constant, or substantially constant, boiling point mixture. The inventors have found that the provision of a mixture comprising a solvent selected from mesityl oxide, 2-methyltetrahydrofuran, 2-butanone, dioxane, furfural; and a thermochemical oil comprising water forms an azeotrope comprising said solvent and water, which can be boiled off at mild reactions conditions, thereby forming a dewatered pyrolysis oil. The above solvent, e.g. mesityl oxide, dissolves the pyrolysis oil as well as other components of the mixture efficiently, thereby facilitating the dewatering process.

In some examples the mixture furthermore comprises raw tall diesel (RTD), or other mixtures of fatty acids. The above solvents are furthermore advantageous in that they are capable of efficiently dissolving raw tall diesel and/or other mixtures of fatty acids. Thus, a mixture comprising raw tall diesel may be dewatered with high efficiency using the above-described process.

The azeotrope may be recovered by condensation. After condensation of the azeotrope, the solvent can be recovered by separation from the water using simple techniques such as liquid-liquid phase separation. Liquid-liquid phase separation is a unit operation known to a person skilled in the art. Compared to e.g. separation between other solvents and water, such as lower alcohols and water, separation between the above-described solvents and water, such as between mesityl oxide and water, is easier and requires less complicated processing for efficient separation and recovery.

It has been shown that the addition of any one of the inventive solvents to a thermochemical oil comprising water allows for the formation of a mixture from which an azeotrope comprising said solvent and water can be boiled off. The azeotrope can be boiled off under milder conditions than would be required for the removal of water using conventional distillation, in particular at a lower temperature.

The azeotrope may further comprise volatile low-molecular weight organic components. Volatile organic low molecular weight molecules and water can interfere during chemical modification of thermochemical oils, such as pyrolysis bio oils, by chemical transformations leading to non-productive side reactions. The above-described process can thus also remove such organic molecules from the thermochemical oil.

By providing a dewatered thermochemical oil, the amount of non-productive side product, which do not contribute positively to the target end-product (e.g. a transportation fuel), can be held to a minimum, owing primarily to the milder conditions. In addition, low molecular weight organic components do not contribute positively to petrol or diesel boiling point range hydrocarbon transport fuels after oil refinery hydrotreatment/hydrocracking processing.

The volatile organic low molecular weight components may be components having six carbon atoms or less, such as components having 5 carbon atoms or less.

The solvent may be mesityl oxide. Mesityl oxide has proven particularly advantageous in efficiently dissolving the thermochemical oil, which yields a homogenous mixture of the thermochemical oil and mesityl oxide. Mesityl oxide has furthermore proven efficient in dissolving also raw tall diesel and other mixtures of fatty acids The heating may be performed at a temperature in the range of less than 80° C., such as in the range of from 40° C. to 80° C., preferably in the range of from 50° C. to 70° C., more preferably of around 60° C. The low temperatures ensure that the desired organic components of the pyrolysis oils remain as intact as possible, while being sufficient for removing undesired volatile low-molecular weight organic components that do not contribute positively to the target end-product during downstream processing or cause corrosion problems in process equipment. Most importantly, these low temperatures have been found sufficient to boil off an azeotrope formed of the above-described solvent and water from a mixture of a thermochemical oil comprising water and the above-described solvent, thereby forming a dewatered thermochemical oil. The mild temperature is also advantageous in that it reduces the amount of chemical reactions between the components of the pyrolysis oils, which would eventually lead to oligomers or polymers which could potentially make subsequent processing more difficult and low-yielding.

Furthermore, the low temperatures are advantageous also from an economical and an environmental viewpoint.

The heating may be performed under pressure in the range from 10 to 100 mbar. A reduced pressure is advantageous in that it allows the dewatering to take place at a lower temperature than a similar dewatering performed at atmospheric pressure.

In some examples, the above-described process further comprises recovering said solvent from the azeotrope removed from the mixture. The recovering of the solvent may comprise phase separation, such as liquid-liquid phase separation. Almost all of the solvent can be recovered using simple separation techniques, which ensures good material economy. In some examples at least 90 mass-% of said solvent, such as at least 95 mass-%, preferably at least 99 mass-%, may be recovered. The recovered solvent may be subjected to further treatment to ensure its purity, such as distillation to remove volatile organic low-molecular weight components.

At least part of the recovered solvent may be recirculated in a) adding a solvent selected from mesityl oxide, 2-methyltetrahydrofuran, 2-butanone, dioxane and furfural; to form a mixture comprising the thermochemical oil and said solvent. By recirculating at least part of the recovered solvent, an advantageous material economy can be provided. In some examples, at least 50 mass-% of the recovered solvent is recirculated in a) of the above-described process. The recovered solvent may also be used for other purposes.

The thermochemical oil may comprise a compound having a hydroxyl group. The compound having a hydroxyl group may be an alcohol or a phenol, preferably an alcohol, or a compound having both alcohol and phenol functionality. When the hydroxyl group is an alcohol, esters may conveniently form via several routes of esterification and trans-esterification.

The process may after the step of heating the mixture further comprise the following: adding a compound having an acyl group to the dewatered thermochemical oil comprising a compound having a hydroxyl group; and reacting the compound having a hydroxyl group with the compound having an acyl group, thereby forming an ester between said compounds.

Esterification of e.g., alcohols and, depending on esterification method, phenols of the dewatered thermochemical oil with, e.g., added fatty acids, or by trans-esterification of, e.g., added triglycerides (fats) with, e.g., alcohols of the thermochemical oil may be performed to mitigate the poor miscibility between thermochemical oils and fossil and other lipophilic oil refinery feedstock. Esterification or transesterification of components of the dewatered thermochemical oil results in an oil derivative having a significantly increased lipophilicity. The obtained oil derivative displays suitable properties for successful hydrotreatment/hydrocracking to transport fuels in standard oil refinery reactor systems with or without mixing with fossil feed components.

Herein, the term "adding a compound having an acyl group to the dewatered thermochemical oil comprising a compound having a hydroxyl group" refers to a step that is separate from the step of providing the thermochemical oil. That is, although the thermochemical oil may very well contain a compound having an acyl group, the step of adding a compound having an acyl group to the dewatered thermochemical oil refers to a separate addition of another compound having an acyl group.

The compound having an acyl group may be a carboxylic acid, an ester, carboxylic acid halide or a carboxylic acid anhydride. The compound having an acyl group may alternatively be a carboxylic acid chloride. Carboxylic acids and esters are readily available as renewable feedstocks. Carboxylic acid anhydrides form esters with both alcohols and phenols. Carboxylic acid chlorides similarly form esters, however with simultaneous release of stoichiometric chloride.

The compound having an acyl group may be provided by conversion of a carboxylic acid to a carboxylic acid anhydride or a carboxylic acid chloride, preferably by conversion of a carboxylic acid to a carboxylic acid anhydride. Conversion of carboxylic acids, which are readily available as renewable feedstocks, to carboxylic acid anhydrides or carboxylic acid chlorides allows for effective formation of esters with the compound having a hydroxyl group. Carboxylic acids may be converted to carboxylic acid anhydrides or carboxylic acid chlorides by reaction with, e.g., acetic anhydride or thionyl chloride, respectively. Conversion may occur separately from or integrated with reaction of the compound having a hydroxyl group with the compound having an acyl group In practice, the compound having an acyl group or the starting material for conversion to such compound may be added as a composition of carboxylic acids, esters, carboxylic acid anhydrides, and/or carboxylic acid chlorides.

The acyl group may have a straight or branched, saturated or unsaturated, preferably saturated, carbon chain with at least 2 carbons, such as 2 to 24 carbons, preferably at least 4 carbons, such as 4 to 18 carbons, more preferably 6 to 18 carbons. The acyl group having a saturated carbon chain, the ester formed consumes less hydrogen in subsequent hydrotreatment or hydrocracking thereof. The acyl group having at least 2 carbons, the ester formed has a marked lipophilicity. The acyl group having at least 4 carbons, the ester formed will, after, e.g., hydrotreatment thereof, be of value in a gasoline or diesel boiling point range fuel composition. The acyl group having 3 to 6 carbons, such as in volatile fatty acids, the ester formed may thus contribute towards lipophilicity and fuel value. The acyl group having no more than 18 carbon atoms, the ester formed will, after, e.g., hydrotreatment, be of value in a gasoline or diesel fuel composition without a need for cracking thereof.

The carboxylic acid, either as the compound having an acyl group or as starting material for conversion to such compound, may be a fatty acid. The carboxylic acid anhydride may be a fatty acid anhydride. The carboxylic acid chloride may be a fatty acid chloride. The ester, either as the compound having an acyl group or as starting material for conversion to such compound, may be a triglyceride or a fatty acid ester. Herein, also in regard of the fatty acid group(s) of a fatty acid anhydride, fatty acid chloride, triglyceride or fatty acid ester, the term "fatty acid" refers to volatile fatty acids, having 3 to 6 carbons, as well as to long-chain fatty acids, having more than 6 carbons and typically up to 20 carbons. A long-chain fatty acid is preferred, making pronounced contribution to lipophilicity and fuel value.

The carboxylic acid, either as the compound having an acyl group or as starting material for conversion to such compound, may be provided as renewable feedstock, preferably as raw tall diesel, tall oil fatty acids (TOFA), palm fatty acid distillate (PFAD), algae oil fatty acids or volatile fatty acids having 3 to 6 carbons, or a blend thereof. The ester, either as the compound having an acyl group or as starting material for conversion to such compound, may be provided as renewable feedstock, preferably as vegetable oil, such as rapeseed oil or technical corn oil, animal fat, marine oil, algae oil, used cooking oil or fatty acid methyl esters (FAME), or a blend thereof.

The objects of the invention are also accomplished by a dewatered thermochemical oil obtainable by the above-described process. The composition of the dewatered thermochemical oil, in particular in view of the water content, volatile organic low molecular weight component content, oligomer and/or polymer content, and/or chain length distribution thereof, is different from the composition of conventional fossil and/or renewable oil thermochemical oils.

The objects of the invention are also accomplished by a fuel precursor obtainable by the above-described process. The composition of the dewatered fuel precursor, in particular in view of the water content, volatile organic low molecular weight components, and/or chain length distribution thereof, is different from the composition of conventional fossil and/or renewable oil fuel precursors.

Esterification Techniques

Techniques for forming an ester by reacting the compound having a hydroxyl group with the compound having an acyl group are exemplified by, but not limited to, the following.

Acid-Catalyzed Esterification of the Thermochemical Oil with Fatty Acids.

Mainly aliphatic alcohols of the thermochemical oil are reacted with fatty acids in the presence of acidic catalysts [2] like sulfuric acid or other mineral acids, acidic polymer-bound ion exchange resins like Amberlyst 15 or Amberlyst 70, molecular sieves, metal oxides like zeolites and sulfated metal oxides. Reaction temperatures may be in the range from ambient temperature to up to 250-300° C. The reaction, which is an equilibrium reaction, is often driven forward by simultaneous removal of water by vacuum or ambient pressure distillation, using molecular sieves added or other methods. This esterification method provides a partially esterified thermochemical oil, in which, as mentioned above, mostly or exclusively the aliphatic alcohols are esterified in varying yields. The product mixture has a lower acidity and therefore a higher stability than the starting thermochemical oil.

Trans-Esterification [3] of Triglycerides (Fats) with the Thermochemical Oil.

Mainly aliphatic alcohols of the thermochemical oil are reacted with triglycerides (fats) or other esters of fatty acids in the presence of Brønsted acids like sulfuric acid or other mineral acids, acidic polymer-bound ion exchange resins like Amberlyst 15 or Amberlyst 70, molecular sieves, metal oxides like zeolites and sulfated metal oxides, Lewis acids like titanium tetraethoxide or iron(II) sulfate, or in the presence of bases like for instance sodium or potassium methoxide or ethoxide, sodium or potassium hydroxide, calcium oxide and magnesium oxide. Trans-esterification may also be performed under neutral conditions [3]. Reaction temperatures may be in the range from ambient temperature to up to 250-300° C. The reaction, which is an equilibrium reaction, is often driven forward by either simultaneous removal of the more low-boiling alcohol in the original ester (in this case glycerol) by vacuum or ambient pressure distillation, or by other methods. This esterification method provides a partially esterified pyrolysis oil, in which, as mentioned above, mostly or exclusively the aliphatic alcohols are esterified in varying yields. The product mixture has a lower acidity and therefore a higher stability than the starting thermochemical oil.

Esterification of Pyrolysis Oils with Fatty Acid-Containing Anhydrides.

Reaction of the alcohols and phenols in the thermochemical oil with either mixed anhydrides between fatty acids and a different carboxylic acid [4], or with symmetrical anhydrides of fatty acids [4], give rise to both alcohol and phenol esters and can therefore lead to a substantially higher degree of esterification of the thermochemical oil than for instance the two techniques mentioned above. This type of reaction requires that there is first a formation of either mixed or symmetrical anhydrides of the fatty acids, which then react with alcohols and phenols of the thermochemical oil catalyzed by bases like pyridine, trialkylamines, N-methylimidazole etc. The relatively high degree of esterification obtained depending on how the reaction is run, gives a stable and highly lipophilic product mixture.

Esterification of Pyrolysis Oil with Fatty Acids Using Other Methods.

There are many other types of reactions than the ones described above which can be used to prepare carboxylic esters [5]. One economically reasonable alternative to the methods described above, which also displays a good atom economy is to make esters by reacting acid chlorides with alcohols.

Esterification of Pyrolysis Oils with Fatty Acid-Containing Anhydrides without Base Catalyst.

Reaction of the alcohols and phenols in the thermochemical oil with symmetrical or mixed anhydrides of fatty acids, which are readily available from the reaction of fatty acids with for instance acetic anhydride, give rise to both alcohol and phenol esters, by a reaction which does not require to be catalyzed by bases like pyridine, trialkylamines, N-methylimidazole etc. Instead, a sufficiently high reaction temperature may be used to achieve a high degree of esterification of at least the same degree or higher as the catalyzed esterifications described above. The esterification without catalyst is advantageous in that it provides a good overall material economy. Furthermore, it significantly reduces the amount of chemicals which need to be separated and recycled after the derivatization.

Therefore, the present disclosure also provides a process for obtaining an oil derivative, the process comprising the following steps:
  providing a thermochemical oil comprising a compound having a hydroxyl group, wherein the thermochemical oil is crude or refined oil resulting from thermochemical conversion of organic material;
  adding a compound having an acyl group, wherein the compound having an acyl group is a symmetrical or mixed anhydride of a fatty acid, to the thermochemical oil; and
  reacting the compound having a hydroxyl group with the compound having an acyl group, thereby forming an ester between said compounds,
  wherein the step of reacting is performed at a temperature in the range of 100–180° C., in the absence of a base catalyst material.

In the non-catalyzed reaction, the reaction temperature is in the range of 100–180° C., such as in the range of 140–180° C. such as preferably in the range of 150–170° C. The above non-catalyzed esterification technique may very well be preceded by the above-described process for dewatering a thermochemical oil. However, it may also be performed without such pre-treatment.

In some embodiments, the process comprises the following steps:
  providing a thermochemical oil comprising a compound having a hydroxyl group, wherein the thermochemical oil is crude or refined oil resulting from thermochemical conversion of organic material;
  adding a compound having an acyl group, wherein the compound having an acyl group is acetic anhydride, to the thermochemical oil; and
  reacting the compound having a hydroxyl group with the compound having an acyl group, thereby forming an ester between said compounds,
  wherein the step of reacting is performed at a temperature in the range of 100–180° C., in the absence of a base catalyst material.

In some embodiments, the thermochemical oil is a pyrolysis oil, preferably a pyrolysis bio oil, a hydrothermal liquefaction oil, preferably a hydrothermal liquefaction bio oil, or a blend thereof, more preferably a pyrolysis oil, most preferably a pyrolysis bio oil.

In some embodiments, the thermochemical oil is a pyrolysis bio oil.

In some embodiments, the thermochemical oil is a dewatered thermochemical oil obtained by the above-described process.

BRIEF DESCRIPTION OF THE DRAWINGS

The above objects, as well as other apparent objects of the invention will now be described with reference to the following detailed description and drawings, wherein FIG. 1 shows a flow-sheet explaining the steps of the process in accordance with some embodiments of the invention.

AZEOTROPIC DISTILLATION

Azeotropic distillation is based on the formation and removal of an azeotrope comprising at least two components. In the present invention, the azeotrope in question comprises water from the thermochemical oil and a solvent selected from mesityl oxide, 2-methyltetrahydrofuran, 2-butanone, dioxane and furfural. An azeotrope refers to a constant, or near constant, boiling point mixture. An azeotrope formed by water contained in the thermochemical oil and one of the above solvents has been found to boil at mild conditions, such as at temperatures of below 80° C. under a reduced pressure of less than 100 mbar, such as less than 50 mbar. Compared to conventional distillation of water, which takes place at elevated temperatures, the azeotropic distillation of the invention involves much milder conditions. Such mild conditions ensure that the desired organic components of the pyrolysis oils remain intact and avoid extensive oligomerization and polymerization reactions in the pyrolysis oils thereby decreasing the risks of clogging transfer lines by undesired separation of poorly soluble components, as well as by potentially lowering the coking tendency of the feed during subsequent hydrotreatment upgrading. At the same time, the mild conditions are sufficient for removing undesired low molecular weight organic compounds from the thermochemical oil.

Herein, the solvent may be mesityl oxide, such as unsubstituted mesityl oxide, but the term also refers to substituted mesityl oxide, such as mono-substituted mesityl oxide or di-substituted mesityl oxide.

Techniques for azeotropic distillation, or co-evaporation, of a mixture comprising a thermochemical oil comprising water and one of the above-described solvents are exemplified by, but not limited to, the following.

FIG. 1 shows a conceptual flow chart illustrating an embodiment of the inventive process 100 for producing a dewatered pyrolysis oil.

The process steps are briefly described as follows.

A pyrolysis oil and raw tall diesel is charged 101 to a reactor. Mesityl oxide (technical grade, 85%) w/w is charged 103 to the reactor to form a mixture. The mixture may be formed by means known to a person skilled in the art. The mixture is then heated 105 to approximately 60° C. at a reduced pressure (typically below 50 mbar) during stirring of the mixture. An azeotrope comprising mesityl oxide and water, and preferably also volatile low-molecular weight organic components is boiled off, to form a dewatered pyrolysis oil. A dewatered pyrolysis oil containing some residual mesityl oxide is obtained 107. The residual solvent will eventually give isohexane after hydrotreatment. The azeotrope boiled off may be recovered 109 and a mesityl oxide phase is separated 111 from an aqueous phase, preferably by means of liquid-liquid phase separation. The mesityl oxide phase may then be distilled 113 for removal of undesirable organics. Optionally, the distilled mesityl oxide can be recirculated in the charging 103.

If the water content of the dewatered pyrolysis oil is deemed too high, the dewatered pyrolysis oil may be recirculated 115 in the charging 101, to be dewatered once more. The dewatered pyrolysis oil may be recirculated until a desired water content has been achieved.

EXAMPLES

Analyses

Hydroxyl numbers related to aliphatic alcohols (ROH), phenols (ArOH) and carboxylic acids (COOH) were determined by $^{31}$P-NMR.

Raw Materials

Wood oil characterization: Pyrolysis oil produced by fast pyrolysis of wood material and subsequent condensation of the vapors was obtained from BTG Biomass Technology Group BV, Netherlands.

Raw tall diesel characterization: Tall oil is a by-product from the pulp and paper industry and mainly consists of resin acids and free fatty acids. Raw tall diesel (RTD) is produced from tall oil through a (vacuum distillation process, during which the content of free fatty acids is increased relative to the resin acids and other components. Raw tall diesel was obtained from Sunpine AB, Sweden.

Solvents and other chemical used herein are readily available off-the-shelf chemicals.

Example 1. Dewatering of Pyrolysis Oil and RTD with Mesityl Oxide

A 50 L stainless steel reactor was evacuated and purged with nitrogen (three cycles). Pyrolysis oil (10.06 kg, water content 22% w/w) and raw tall diesel (RTD) (13.14 kg) were charged to the reactor, followed by mesityl oxide (7.99 kg). The mixture was heated to 57° C., initially at ambient pressure, then vacuum was applied, resulting in distillation of the mesityl oxide/water azeotrope. The water was separated in a siphon and was directed to one of the receiving vessels, while the mesityl oxide was recirculated to the reactor. The distillation was continued for at least 3 h. A second portion of mesityl oxide (8.17 kg) was charged to the reactor, and the distillation was continued at reduced pressure ($T_i$ 77° C., $T_d$ 48-56° C.) over ca 30 min until dewatering was complete. The collected water (2.52 kg) contained some polar low molecular weight organic components. $T_m$ was set to 90° C., and the pressure was decreased gradually. The distillation was continued over ca 5 h, end conditions $T_i$ 87° C. The system was purged with nitrogen to equalize the pressure, and $T_m$ was set to 75° C. The distillate (16.31 kg, recovered mesityl oxide) was collected. The contents of the reactor were treated as described below in Example 4.

Example 2. Dewatering of Pyrolysis Oil with Various Solvents

A pyrolysis oil containing 17% water (5 g) was placed in a 100 mL round bottomed flask and the solvent (25 mL) was added. The flask was placed on a rotary evaporator and heated at 60° C. for 15 minutes before reduced pressure was applied. After 1 h at this temperature and pressure, the flask was removed, and the water content in the residue was measured using a Karl Fischer titrator with titrating reagent Hydranal Composite K. The results for various solvents are shown in Table 1.

TABLE 1

Comparison of the dewatering efficiency of selected solvents.

| Solvent | Residual water (% w/w) |
| --- | --- |
| Furfural | 0.04 |
| 2-Methyl tetrahydrofuran | 0.52 |
| Acetic acid | 0.56 |
| Mesityl oxide | 0.46 |
| Toluene | 2.1 |
| Methyl iso-butyl ketone | 0.58 |

Example 3. Dewatering of Pyrolysis Oil and RTD with Various Solvents

A pyrolysis oil containing 21% water (2 g) and RTD (5 g) were placed in a 100 mL round bottomed flask and the solvent (25 mL) was added. The flask was placed on a rotary evaporator and heated at 60° C. for 15 minutes before reduced pressure was applied. After 1 h at this temperature and pressure, the flask was removed, and the water content was measured using Karl Fischer titrator with titrating reagent Hydranal Composite K. The results for various solvents are shown in Table 2.

TABLE 2

Comparison of the dewatering efficiency of selected solvents when applied to pyrolysis oil/RTD mixtures.

| Solvent | Residual water (% w/w) |
| --- | --- |
| Heptane | 0.66 |
| Toluene | 0.65 |
| 2-Methyl tetrahydrofuran | 0.14 |
| Mesityl oxide | 0.10 |
| Methyl iso-butyl ketone | 0.28 |
| n-Butanol | 0.14 |
| Pyridine | 0.13 |
| Furfural | 0.14 |

Example 4. Derivatization

Acetic anhydride (8.09 kg) was charged to the reactor ($T_i$ 73° C.) of Example 1. After 1 h, $T_m$ was set to 90° C., and the mixture was stirred for 30 min ($T_i$ 80° C.). After ca 2 h ($T_i$ 89° C.), $T_m$ was set to 120° C. The reaction was continued for ca 2 h, whereupon vacuum was applied ($T_m$ 119° C., $T_i$ 116° C.). The distillation was carried out over a period of ca 3 h at reduced pressure, while gradually adjusting $T_m$ to 165° C. The system was purged with nitrogen, $T_m$ was set to 25° C. The distillate (7.96 kg) was collected, containing acetic acid (5.60 kg), acetic anhydride (1.51 kg) and mesityl oxide (0.48 kg). The intermediate derivatized pyrolysis oil product (19.58 kg) as a brown homogeneous liquid was transferred to containers. A sample was evaluated for miscibility with LLGO at 20% concentration failed to give a homogeneous mixture. The intermediate product subjected to post-treatment at 170° C. under vacuum in an 8 L autoclave equipped with a condenser followed by a cold-trap in the vacuum line as four separate portions (total treated 18.88 kg). Heating was maintained overnight. After cooling to ambient temperature, each product mixture was transferred to a container, and the distillate fractions in the receiving vessel on the condenser and in the cold trap were collected. The details for each sub-batch are provided in Table 4. Each of the sub-batches was tested for miscibility with LLGO at 20% v/v concentration, which proved to be satisfactory in all cases (brown homogeneous liquid). The total product yield was 17.99 kg as a brown homogeneous liquid.

TABLE 3

Post-treatment of intermediate product from derivatization, with yields and hydroxyl number measurements for each split batch after post-treatment (final derivatized pyrolysis oil product).

| Experiment/ Batch # | Intermediate product charged (kg) | Final product (kg) | Yield (% w/w) | Distillate (kg) | Aliphatic-OH (mmol/g) | Phenols (mmol/g) | Carboxylic acids (mmol/g) |
| --- | --- | --- | --- | --- | --- | --- | --- |
| Intermediate product | | | | | 0.29 | 0.09 | 0.62 |
| Split batch 1 | 4.73 | 4.41 | 93 | 0.214 | 0.10 | 0.04 | 0.98 |
| Split batch 2 | 4.69 | 4.57 | 97 | 0.232 | 0.08 | 0.01 | 0.98 |
| Split batch 3 | 4.67 | 4.41 | 94 | 0.167 | 0.10 | 0.03 | 1.12 |
| Split batch 4 | 4.79 | 4.60 | 96 | 0.196 | 0.08 | 0.02 | 1.00 |
| Total | 18.88 | 17.99 | 95 | 0.809 | | | |

Abbreviations
$T_i$ = Inner temperature measured in the reaction mixture
$T_m$ = Temperature of medium in heating mantle
$T_d$ = Temperature of the distillate (vapor phase)
LLGO = Light light gas oil

REFERENCES

[1] A. H. Zacher, M. V. Olarte, D. M. Santosa, D. C. Elliott and S. B. Jones, Green Chem., 2014, 16, 491, DOI: 10.1039/C3GC41382A.
[2] M. B. Smith and J. March, Advanced Organic Chemistry, Reactions, Mechanisms and Structure, 6th Edition, John Wiley & Sons, 2007, ISBN 13: 978-0-471-72091-1, ISBN 10: 0-471-72091-7, pages 1414-1416 and references therein.
[3] M. B. Smith and J. March, Advanced Organic Chemistry, Reactions, Mechanisms and Structure, 6th Edition, John Wiley & Sons, 2007, ISBN 13: 978-0-471-72091-1, ISBN 10: 0-471-72091-7, pages 1419-1421 and references therein.
[4] M. B. Smith and J. March, Advanced Organic Chemistry, Reactions, Mechanisms and Structure, 6th Edition, John Wiley & Sons, 2007, ISBN 13: 978-0-471-72091-1, ISBN 10: 0-471-72091-7, pages 1412-1414 and references therein.
[5] B. M. Trost and I. Fleming, Comprehensive Organic Synthesis, Volume 6 Heteroatom Manipulation, Pergamon Press Ltd, 1991, Chapter 2.2 Synthesis of Esters, Activated Esters and Lactones, ISBN 0-08-040597-5, pages 323-380.

The invention claimed is:

1. A process for producing a dewatered thermochemical oil comprising:
   a) providing a thermochemical oil comprising water;
   b) adding a solvent selected from mesityl oxide, 2-methyltetrahydrofuran, dioxane and furfural to the thermochemical oil, to form a mixture comprising the thermochemical oil and the solvent;
   c) heating the mixture to remove an azeotrope comprising water and the solvent from the mixture, thereby forming a dewatered thermochemical oil,
   wherein the heating is performed at a temperature of less than 80° C. and under a pressure in the range from 10 to 100 mbar.

2. The process according to claim 1, wherein the solvent is mesityl oxide.

3. The process according to claim 1, wherein the thermochemical oil is a pyrolysis bio oil.

4. The process according to claim 1, further comprising recovering the solvent from the azeotrope removed from the mixture.

5. The process according to claim 4, wherein the step of recovering the solvent comprises phase separation means.

6. The process according to claim 5, wherein at least 90 mass-% of said solvent is recovered.

7. The process according to claim 1, wherein the thermochemical oil comprises a compound having a hydroxyl group.

8. The process according to claim 7, wherein the compound having a hydroxyl group is an alcohol or a phenol.

9. The process according to claim 7, which after the step of heating the mixture further comprises the following steps:
- adding a compound having an acyl group to the dewatered thermochemical oil comprising a compound having a hydroxyl group; and
- reacting the compound having a hydroxyl group with the compound having an acyl group, thereby forming an ester between said compounds.

10. The process according to claim 9, wherein the compound having an acyl group is a carboxylic acid, an ester, carboxylic acid halide or a carboxylic acid anhydride.

11. The process according to claim 10, wherein the carboxylic acid is provided as renewable feedstock, and/or the ester is provided as renewable feedstock.

\* \* \* \* \*